(12) United States Patent
Lee et al.

(10) Patent No.: US 10,177,422 B2
(45) Date of Patent: Jan. 8, 2019

(54) BATTERY MODULE

(71) Applicant: SK INNOVATION CO., LTD., Seoul (KR)

(72) Inventors: Won Jun Lee, Daejeon (KR); Ji Seok Lee, Yeongi-gun (KR)

(73) Assignee: SK Innovation CO., LTD., Seoul (KR)

( * ) Notice: Subject to any disclaimer, the term of this patent is extended or adjusted under 35 U.S.C. 154(b) by 94 days.

(21) Appl. No.: 14/362,205

(22) PCT Filed: Nov. 19, 2012

(86) PCT No.: PCT/KR2012/009776
§ 371 (c)(1),
(2) Date: Jun. 2, 2014

(87) PCT Pub. No.: WO2013/081325
PCT Pub. Date: Jun. 6, 2013

(65) Prior Publication Data
US 2014/0363710 A1 Dec. 11, 2014

(30) Foreign Application Priority Data
Dec. 2, 2011 (KR) .......................... 10-2011-0128199

(51) Int. Cl.
*H01M 10/655* (2014.01)
*H01M 10/6551* (2014.01)
(Continued)

(52) U.S. Cl.
CPC ..... *H01M 10/5061* (2013.01); *H01M 2/1077* (2013.01); *H01M 10/613* (2015.04);
(Continued)

(58) Field of Classification Search
CPC ............. H01M 10/613; H01M 10/656; H01M 10/655; H01M 10/6551; H01M 10/6556; H01M 10/6557; H01M 2/1077
(Continued)

(56) References Cited

U.S. PATENT DOCUMENTS 5,510,207 A * 4/1996 Grivel ....................... F28F 3/12
                                                                   429/120
5,985,483 A * 11/1999 Verhoog ............. H01M 2/1077
                                                                  429/120
(Continued)

FOREIGN PATENT DOCUMENTS

EP        2 187 473      * 5/2010
JP         2009224226     10/2009
(Continued)

OTHER PUBLICATIONS

International Search Report—PCT/KR2012/009776 dated Mar. 29, 2013.
(Continued)

*Primary Examiner* — Anca Eoff
(74) *Attorney, Agent, or Firm* — IP & T Group LLP (57) ABSTRACT

Provided is a battery module including: a case partitioned by a plurality of separation walls disposed in parallel with each other to be spaced apart from each other by a predetermined distance and having a plurality of space parts formed therein; at least one battery cell included in each of the space parts of the case; at least one cooling member having an opened one side coupled to the case, having a passage formed therein when being coupled to the case, and having an inlet in communication with a start point of the passage and an outlet in communication with an end point of the passage; an injecting pipe in communication with the inlet of the cooling member; a discharging pipe in communication with the outlet of the cooling member; and a plurality of
(Continued)

cooling fins attached to the other side of the cooling member in parallel with each other.

6 Claims, 6 Drawing Sheets

(51) Int. Cl.
| | |
|---|---|
| *H01M 10/6555* | (2014.01) |
| *H01M 10/6556* | (2014.01) |
| *H01M 10/656* | (2014.01) |
| *H01M 2/10* | (2006.01) |
| *H01M 10/6568* | (2014.01) |
| *H01M 10/613* | (2014.01) |
| *H01M 10/6557* | (2014.01) |

(52) U.S. Cl.
CPC ... *H01M 10/6551* (2015.04); *H01M 10/6557* (2015.04); *H01M 10/6568* (2015.04)

(58) Field of Classification Search
USPC .......................................................... 429/120
See application file for complete search history.

(56) References Cited

U.S. PATENT DOCUMENTS

| | | | | |
|---|---|---|---|---|
| 6,408,941 | B1* | 6/2002 | Zuo | F28D 9/0025 165/164 |
| 2004/0121231 | A1* | 6/2004 | Kim | H01M 2/021 429/181 |
| 2005/0077615 | A1* | 4/2005 | Yu | H01L 23/367 257/706 |
| 2006/0093899 | A1* | 5/2006 | Jeon et al. | 429/99 |
| 2010/0003581 | A1* | 1/2010 | Kawai | H01G 9/0003 429/53 |
| 2010/0203376 | A1* | 8/2010 | Choi et al. | 429/120 |
| 2010/0236766 | A1* | 9/2010 | Ulics et al. | 165/173 |
| 2011/0059347 | A1 | 3/2011 | Lee et al. | |
| 2011/0223457 | A1* | 9/2011 | Lee et al. | 429/99 |
| 2012/0088131 | A1* | 4/2012 | Chung et al. | 429/72 |

FOREIGN PATENT DOCUMENTS

| | | |
|---|---|---|
| KR | 100667943 | 1/2007 |
| KR | 1020070014631 | 2/2007 |
| KR | 1020070025735 | 3/2007 |
| KR | 1020080042965 | 5/2008 |
| KR | 1020100109872 | 10/2010 |
| WO | WO 2010/067943 * | 6/2010 |
| WO | WO 2010/098598 * | 9/2010 |

OTHER PUBLICATIONS

Office Action issued by the Korean Intellectual Property Office dated Nov. 20, 2017.

* cited by examiner

BATTERY MODULE

TECHNICAL FIELD

The present invention relates to a battery module, and more particularly, to a battery module mounted with a cooling member allowing heating, cooling, or temperature adjustment in the battery module to be performed.

BACKGROUND ART

Generally, a secondary battery may be rechargeable and have increased capacity. A representative example of the secondary battery includes a nickel cadmium battery, a nickel hydrogen battery, a lithium ion battery, and the like. Among them, the lithium ion battery has been spotlighted as the next generation power source due to excellent characteristics such as a long lifespan, high capacity, and the like. Among them, a lithium secondary battery, which has operating voltage of 3.6 V or more, is used as a power supply of a portable electronic device or several lithium secondary batteries are connected in series with each other to thereby be used for a high output hybrid vehicle. Since this lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

The lithium secondary battery may be manufactured in various types. A representative type of the lithium secondary battery may include a cylindrical type and a prismatic type that are mainly used for the lithium ion battery. A lithium polymer battery that has been recently spotlighted is manufactured in a pouch type having flexibility, such that it has a relatively free shape. In addition, the lithium polymer battery has excellent stability and light weight, such that it is advantageous for slimness and lightness of the portable electronic device.

Meanwhile, in a case of a power source for driving a motor of an electric automobile, or the like requiring a large amount of power, several tens of secondary battery cells are connected in series or parallel with each other to thereby configure a battery module.

When a plurality of battery modules are charged or discharged, heat is generated from the cell and charging or discharging performance of the battery cell may be varied depending on a temperature of the cell.

Therefore, it is important to maintain an internal temperature of the battery at appropriate temperature.

A secondary battery module disclosed in Korean Patent Laid-Open Publication No. 2007-0014631 according to the related art includes a plurality of unit cells which are stacked and arranged to efficiently cool heat generated from the unit cell, and a plurality of partitions installed between the unit cells and having a cooling passage formed therein and protrusions formed on both surfaces thereof.

Therefore, the related art relates to a method of cooling the cell while a heat transferring medium is circulated in the plurality of partitions.

However, since the related art has the passage formed in the plurality of partitions, it has a complicated structure, such that the circulation of the heat transferring medium is not smooth.

In addition, since the secondary battery module according to the related art has the complicated structure, it is difficult to manufacture.

RELATED ART DOCUMENT

Patent Document

Korean Patent Laid-Open Publication No. 2007-0014631 (Feb. 1, 2007)

DISCLOSURE

Technical Problem

An object of the present invention is to provide a battery module having a simple structure of circulating a heat transferring medium and excellent cooling efficiency.

Technical Solution

In one general aspect, a battery module includes: a case partitioned by a plurality of separation walls disposed in parallel with each other to be spaced apart from each other by a predetermined distance and having a plurality of space parts formed therein; at least one battery cell included in each of the space parts of the case; at least one cooling member having an opened one side coupled to the case, having a passage formed therein when being coupled to the case, and having an inlet in communication with a start point of the passage and an outlet in communication with an end point of the passage; an injecting pipe in communication with the inlet of the cooling member; a discharging pipe in communication with the outlet of the cooling member; and a plurality of cooling fins attached to the other side of the cooling member in parallel with each other.

The cooling member may be formed to be long in a direction in which the plurality of separation walls are disposed and may be coupled to one end or the other end of the case.

The cooling member may have the passage formed by partitioning an inner portion by a partition.

The cooling member may have the inlet and the outlet formed on the same surface.

The cooling member may have the passage formed by partitioning an inner portion by a plurality of partitions protruded in a zigzag shape into a plurality spaces.

The cooling member may have the inlet and the outlet formed at one end and the other end, respectively.

The plurality of cooling fins may be formed in a plate shape and each one end thereof may be coupled to the other side of the cooling member.

The plurality of cooling fins may have widths from one end coupled to the other side of the cooling member to the other end, wherein the widths may be respectively formed in a zigzag shape.

Advantageous Effects

According to the embodiment of the present invention, the battery module has the cooling member which is simply configured, such that it may be easily manufactured.

In addition, the battery module according to the present invention has the cooling member having the passage which is simply configured, such that the battery module may be quickly and smoothly cooled by the circulation of the heat transferring medium.

In addition, the battery module according to the present invention has the cooling fins attached to the cooling member, such that it may receive the heat from the heat transferring medium circulated in the cooling member and discharge the heat to the atmosphere, thereby further improving cooling effect.

In addition, the battery module according to the present invention has the pipe coupled to the cooling member, such that it may be used by simply inserting into the apparatus generating the heat transferring medium.

In addition, the battery module according to the present invention has the passage configured in the cooling member by at least one partition, such that the passage may be variously configured.

DESCRIPTION OF DRAWINGS

The above and other objects, features and advantages of the present invention will become apparent from the following description of preferred embodiments given in conjunction with the accompanying drawings, in which.

[Detailed Description of Main Elements]

| | |
|---|---|
| 1000: battery module according to the present invention | |
| 100: case | 110: separation wall |
| 120: space part | 200: battery cell |
| 300: cooling member | 301: first region part |
| 302: second region part | 310: inlet |
| 320: outlet | 330: partition |
| 400: injecting pipe | 500: discharging pipe |
| 600: cooling fin | |

BEST MODE

Hereinafter, a technical spirit of the present invention will be described in more detail with reference to the accompanying drawings.

Figure 1:
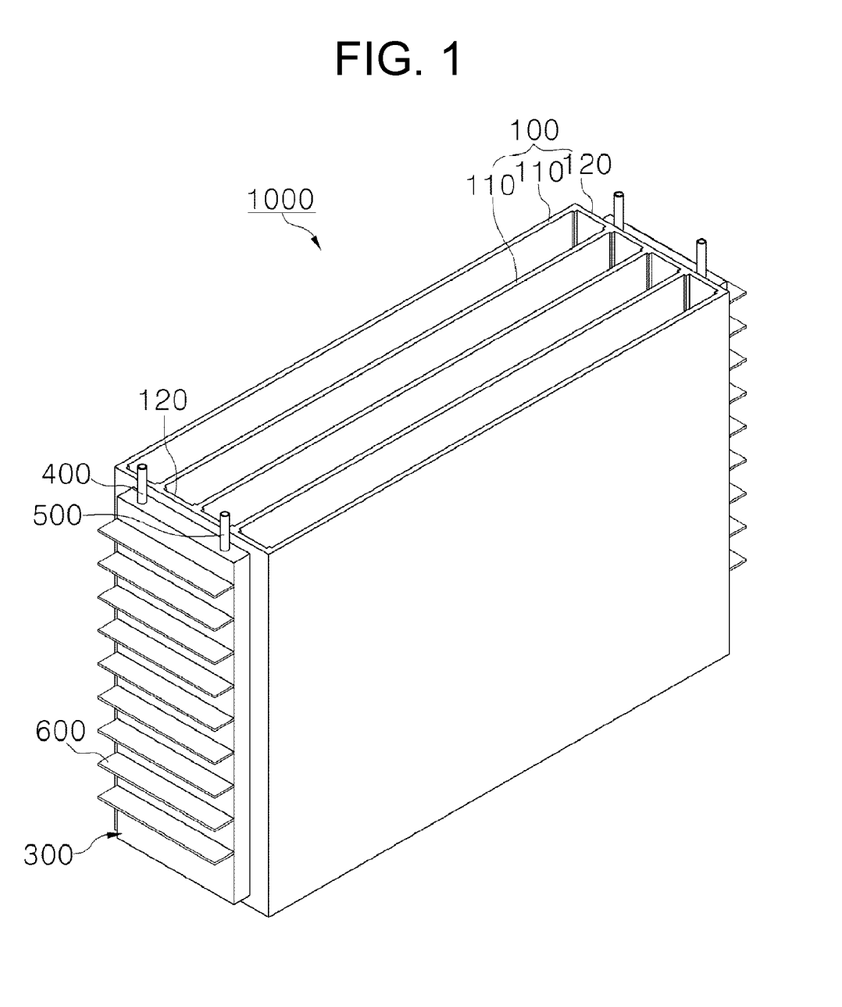
FIG. 1 is a perspective view of a case according to an embodiment of the present invention.
Figure 2:
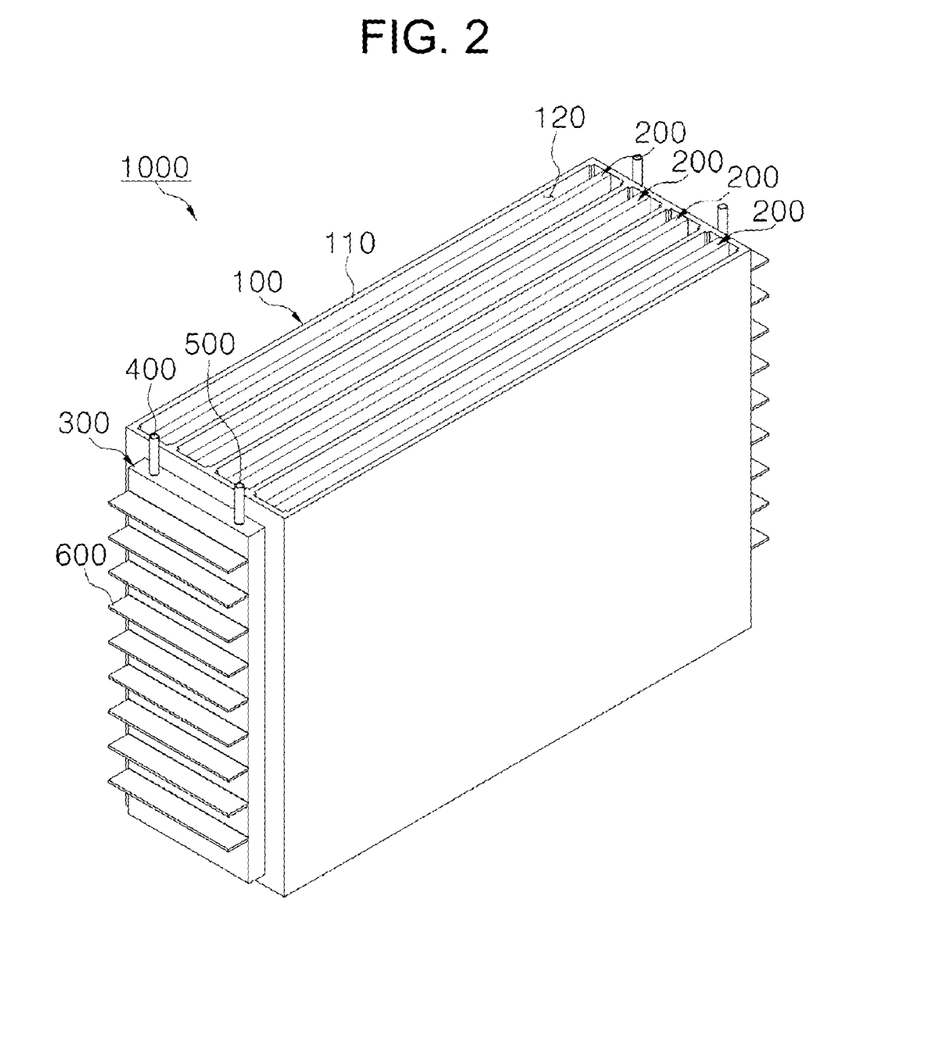
FIG. 2 is a perspective view of a battery module according to an embodiment of the present invention.
Figure 3:
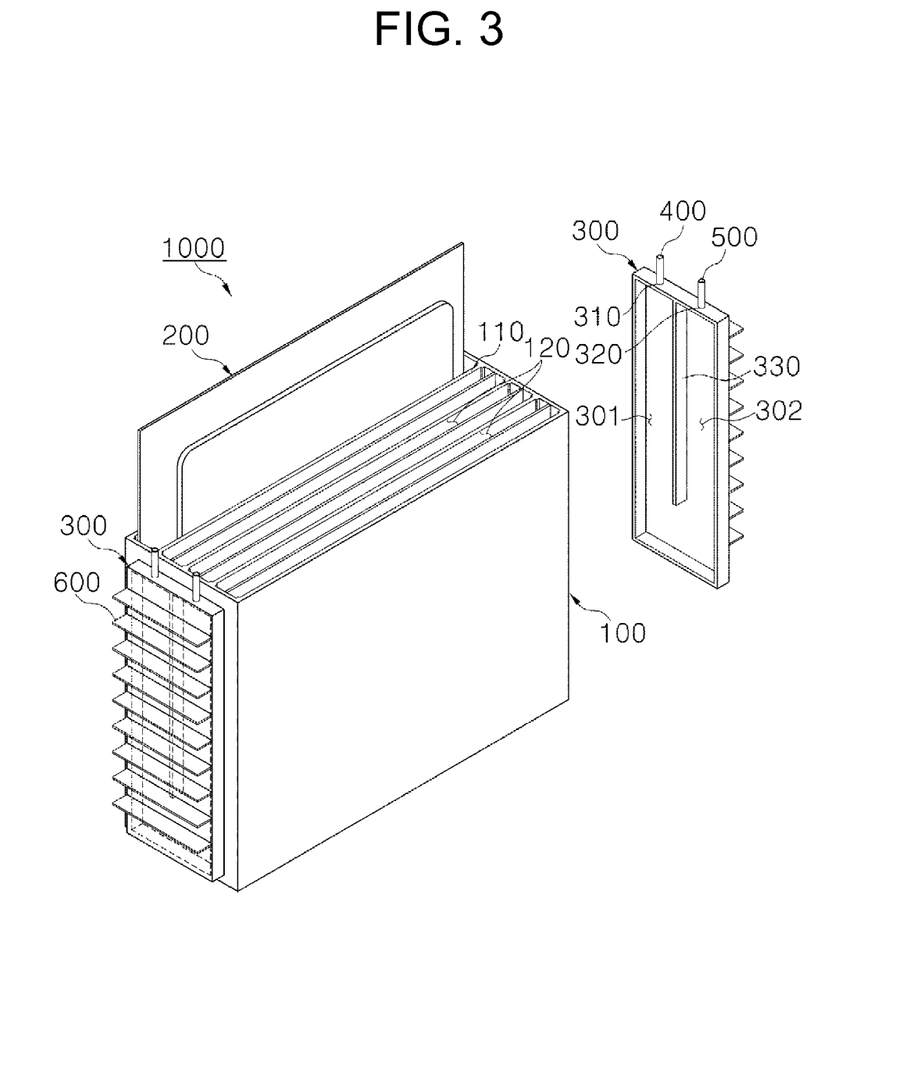
FIG. 3 is an exploded perspective view of the battery module according to the embodiment of the present invention.

FIG. 1 is a perspective view of a case according to an embodiment of the present invention, FIG. 2 is a perspective view of a battery module according to an embodiment of the present invention, and FIG. 3 is an exploded perspective view of the battery module according to the embodiment of the present invention.

As shown in FIGS. 1 to 3, a battery module 1000 according to an embodiment of the present invention is configured to mainly include a case 100, a battery cell 200, a cooling member 300, an injecting pipe 400, a discharging pipe 500, and a cooling fin 600.

The case 100, which is a basic body of the battery module 1000 according to the present invention, includes battery cells 200 therein.

In addition, the case 100 has an internal space partitioned by a plurality of separation walls 110 formed in a plate shape and disposed parallel with each other to be spaced apart from each other by a predetermined distance, thereby having a plurality of space parts 120 formed therein.

Although the drawings show a case in which the case 100 is partitioned by the plurality of separation walls 110 disposed parallel with each other to be spaced apart from each other by the predetermined distance to form the plurality of space parts 120, the present invention is not limited thereto, but may be more variously embodied.

At least one battery cell 200 is included in the plurality of space parts 120 of the case 100.

In this case, the case 100 has bent parts (not shown) having a bottom surface bent toward inner side, such that the bent parts may hold bottom surfaces of the battery cells 200 included in the plurality of space parts 120 of the case 100.

The cooling member 300, which is a member cooling the battery cells 200 using the circulation of the heat transferring medium, has a rectangular parallelepiped shape having an opened one side, wherein the opened one side is coupled to one side of the case 100.

In addition, in the case in which the case 100 covers the opened one side of the cooling member 300 while the cooling member 300 is coupled to the case 100, a passage is formed in the cooling member 300.

An inlet 310 in communication with a start point of the passage by puncturing a predetermined region and an outlet 320 in communication with an end point of the passage by puncturing a predetermined region are formed so that the heat transferring medium may be injected and discharged into and from the passage formed in the cooling member 300.

In order to maximize cooling efficiency, the cooling member 300 may be formed to be long in a direction in which the plurality of separation walls 110 are disposed and be coupled to one end or the other end of the case 100.

As a result, since the battery module 1000 according to the present invention has the cooling member 300 which is simply configured, it may be easily manufactured.

In addition, the battery module 1000 according to the present invention has the cooling member 300 having the passage which is simply configured, such that the circulation of the heat transferring medium may be quick and smooth.

The injecting pipe 400 has one end in communication with the inlet 310 of the cooling member 300 and is coupled to an outer side of the cooling member 300.

The discharging pipe 500 has one end in communication with the outlet 320 of the cooling member 300 and is coupled to an outer side of the cooling member 300.

As a result, the battery module 1000 according to the present invention has the pipe coupled to the cooling member 300, such that it may be used by simply inserting into an apparatus generating the heat transferring medium.

The cooling fin 600 is a portion which more improves the cooling effect of the battery module 1000 according to the embodiment of the present invention by receiving the heat from the heat transferring medium flowing in the cooling member 300 and discharging the heat to the atmosphere and is formed in a plate shape in plural, such that each one end of the cooling fin 600 is attached to the other side of the cooling member in parallel with each other.

As a result, the battery module 1000 according to the present invention has the cooling fins 600 attached to the cooling member, such that it may receive the heat from the heat transferring medium circulated in the cooling member 300 and discharge the heat to the atmosphere, thereby further improving cooling effect.

Figure 4:
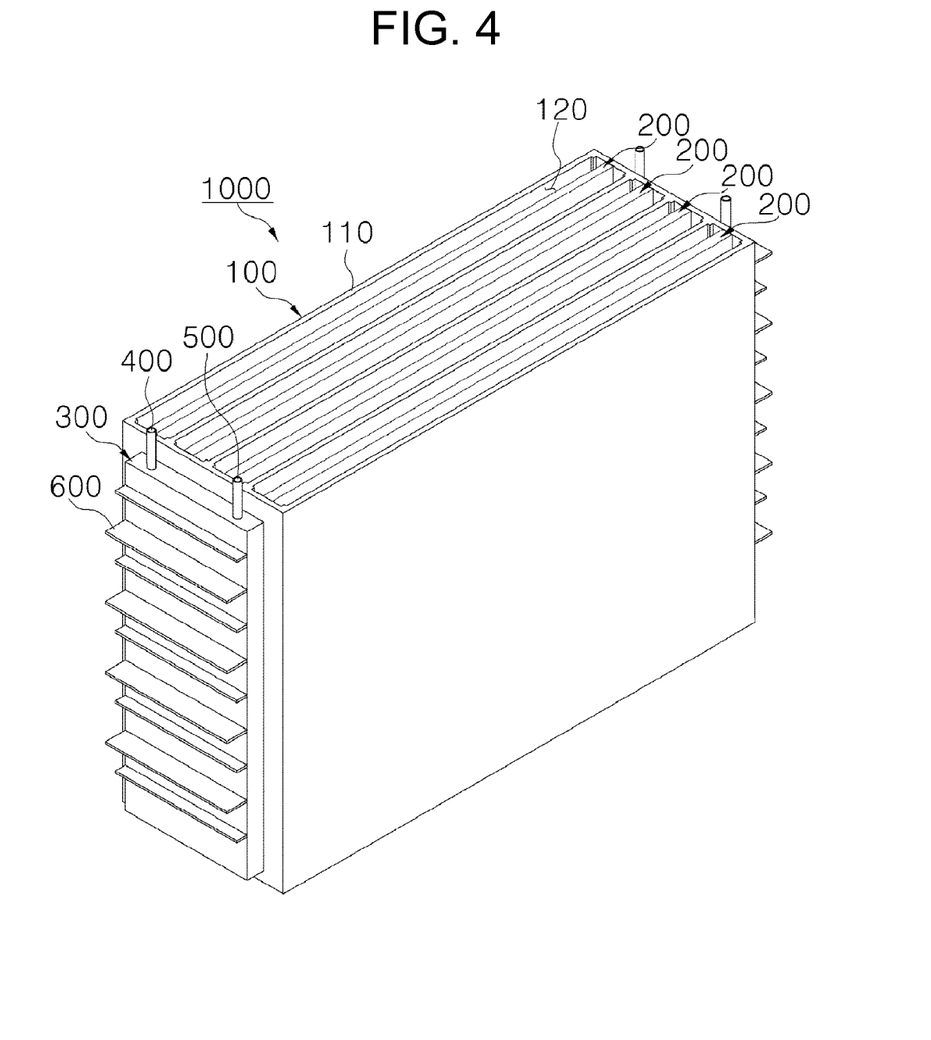
FIG. 4 shows another embodiment of cooling fins according to the present invention.

FIG. 4 shows another embodiment of cooling fins according to the present invention.

As shown in FIG. 4, as another embodiment of the cooling fins 600 according to the present invention, the cooling fins 600 are formed in a plate shape in which a width from one end coupled to the other side of the cooling member 300 to the other end has a zigzag shape.

Although FIG. 4 shows a case in which the widths of the cooling fins 600 from one end coupled to the other side of the cooling member 300 to the other end have the zigzag shape, the present invention is not limited thereto, but may be more variously embodied.

In addition, the passage is formed and positions at which the inlet 310 and the outlet 320 are to be formed are determined, by the partition 330 formed to be protruded in the cooling member 300. A detailed description thereof will be provided below.

Figure 5:
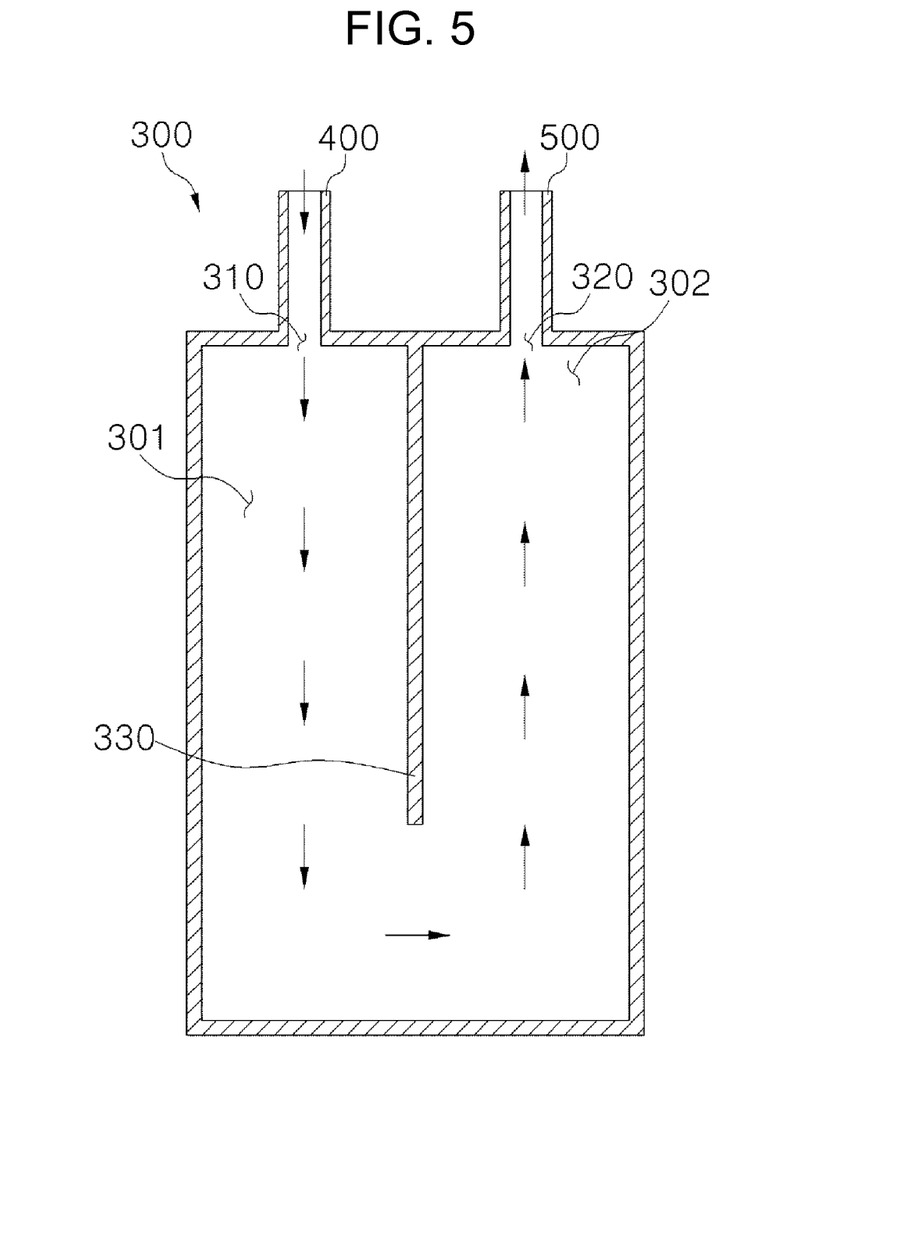
FIGS. 5 and 6 show various embodiments of the cooling member according to the present invention.

FIG. 5 is a cross-sectional view of a cooling member according to an embodiment of the present invention.

As shown in FIG. 5, as an embodiment in which the passage is formed in the cooling member 300, an inner portion of the cooling member 300 is partitioned by the partition 330 formed to be protruded from a center portion of the inner portion while having a predetermined interval from one end of the cooling member 300, such that it is divided into a first region part 301 and a second region part 302, thereby forming the passage.

In this case, the inlet 310 of the cooling member 300 is formed at an outer side of the first region part 301 partitioned by the partition 330 and the outlet 320 of the cooling member 300 is formed at an outer side 302 of the second region part partitioned by the partition 330, wherein they are formed on the same surface of the cooling member 300.

Figure 6:
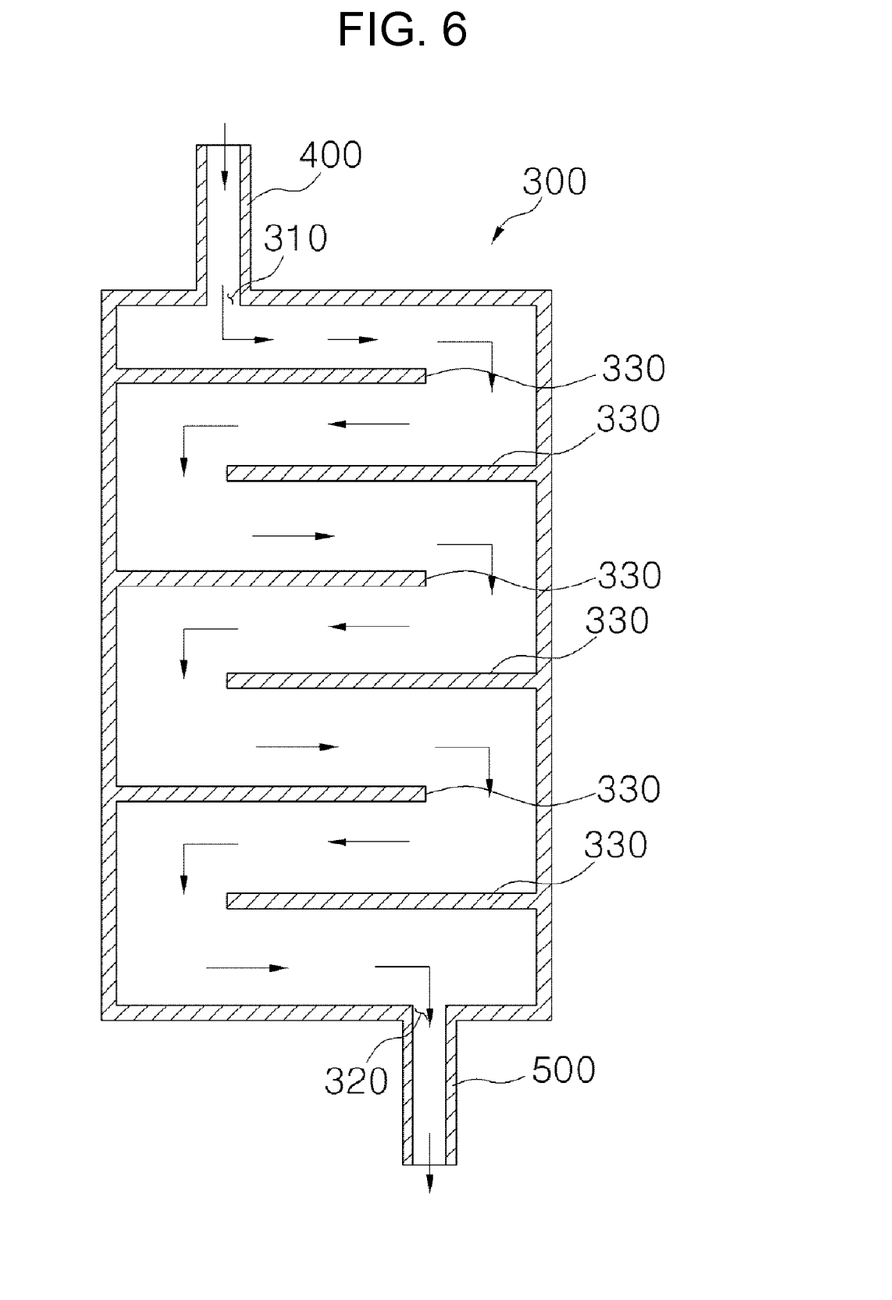

FIG. 6 is a cross-sectional view of a cooling member according to another embodiment of the present invention.

As shown in FIG. 6, as another embodiment in which the passage is formed in the cooling member 300, the cooling member 300 has the passage of a zigzag shape formed by a plurality of partitions 330 protruded in the zigzag shape.

In this case, the cooling member 300 has the inlet 310 formed at one end thereof and the outlet 320 formed at the other end thereof.

As a result, the battery module 1000 according to the present invention has the passage configured in the cooling member by at least one partition, such that the passage may be variously configured.

The accompanying drawings are only examples shown in order to describe the technical idea of the present invention in more detail. Therefore, the technical idea of the present invention is not limited to shapes of the accompanying drawings.

The present invention is not limited to the above-mentioned exemplary embodiments, and may be variously applied, and may be variously modified without departing from the gist of the present invention claimed in the claims.

The invention claimed is:

1. A battery module comprising:
   a case partitioned by a plurality of separation walls disposed in parallel with each other to be spaced apart from each other by a predetermined distance to form a plurality of space parts therein, each separation wall extending in a longitudinal direction of the case;
   at least one battery cell included in each of the space parts of the case; and
   at least one cooling member attached to an outer surface of a side wall of the case that is disposed vertically and perpendicular to the separation walls, the at least one cooling member having an inlet and an outlet and having an open side facing and attached to the outer surface of the case in such a way that the at least one cooling member and the outer surface of the case form a passage therein circulating a heat transferring medium,
   wherein the at least one battery cell is a pouch type battery having a plate form,
   wherein the outer surface of the case is opposite to an inner surface of the case to which parallel edges of the battery cells are disposed, and
   wherein a plurality of cooling fins are protruded from an outer surface of the cooling member for receiving the heat from the heat transferring medium flowing in said passage and discharging the heat to the atmosphere.

2. The battery module of claim 1, wherein the cooling member has at least one partition dividing the passage into at least two region parts where the heat transferring medium flows in a zigzag way.

3. The battery module of claim 2, wherein the at least one partition extends in a direction substantially parallel to the plane of the plurality of the separation walls.

4. The battery module of claim 1, wherein the plurality of cooling fins are protruded with different heights.

5. The battery module of claim 1, wherein an injecting pipe is coupled to the inlet of the cooling member; and a discharging pipe is coupled to the outlet of the cooling member.

6. The battery module of claim 5, wherein the injecting and the discharging pipes extend in a direction parallel to the plane of the plurality of the separation walls.

* * * * *